Jan. 14, 1936.  L. E. LUBBERS  2,027,990
FLEXIBLE AND RESILIENT VEHICLE COUPLING
Original Filed Nov. 24, 1933
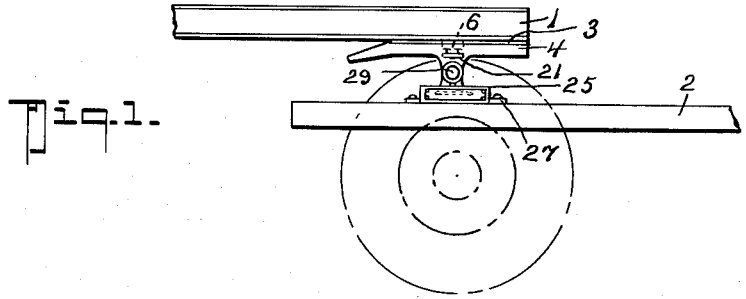
Fig. 1.
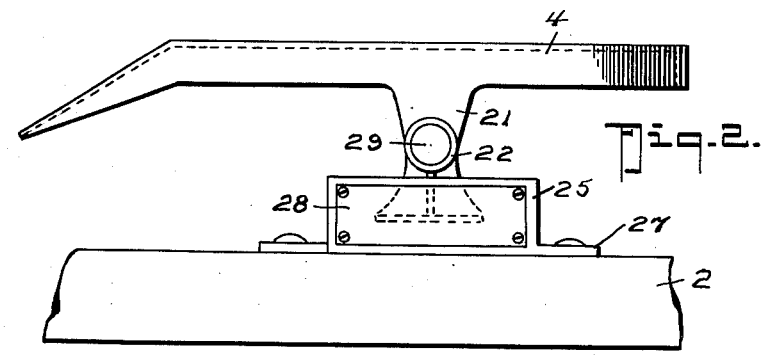
Fig. 2.
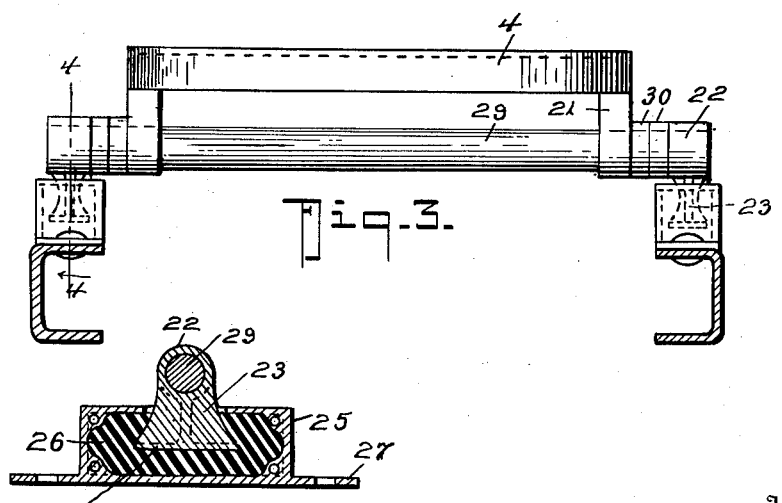
Fig. 3.
Fig. 4.
Inventor
Lubbert E. Lubbers
By Albert E. Dieterich
Attorney Patented Jan. 14, 1936

2,027,990

UNITED STATES PATENT OFFICE 2,027,990

FLEXIBLE AND RESILIENT VEHICLE COUPLING

Lubbert E. Lubbers, Stoughton, Wis., assignor, by direct and mesne assignments, of one-half to The New Stoughton Company, Stoughton, Wis., a corporation of Wisconsin, and one-half to Fruehauf Trailer Company, Detroit, Mich., a corporation of Michigan Original application November 24, 1933, Serial No. 699,611. Divided and this application August 9, 1934, Serial No. 739,181

10 Claims. (Cl. 280—33.1)

This invention has to do with the art of tractors and semi-trailers and it relates particularly to such combined vehicles wherein they are connected through the means of an articulated connection such as a fifth wheel structure. Such a fifth wheel structure may include a lower fifth wheel member on the tractor and an upper fifth wheel member on the trailer, and the forward end of the trailer rests upon the tractor when the two vehicles are in combined operation.

One of the fifth wheel members may be mounted to its respective vehicle so that it may rock on a horizontal axis disposed transversely of the vehicle and such a member may constitute an inclined plane for elevating the semi-trailer as the tractor backs into it in the coupling, and when the vehicles are in coupled relation it may assume a horizontal position in abutment with the opposing fifth wheel member on the other vehicle.

The invention is more particularly directed toward an improved mounting of such a fifth wheel member. While such a fifth wheel member may be on either vehicle it is shown herein as being mounted on the tractor. A principal object of the invention is an improved mounting structure for such a fifth wheel member arranged to take up some of the shocks as may exist between the two vehicles so as to cushion the shock action in such a manner as to deaden or eliminate noises or clatter as the semi-trailer may shift fore and aft as regards the tractor. The invention also aims to provide such a mounting so as to provide a cushion effect for side thrust for the semi-trailer relative to the tractor and also the invention is advantageous for facilitating the mounting of the fifth wheel member, particularly as regards lining up of the bearing members upon which the same may rock.

The invention may reside in a tractor semi-trailer fifth wheel structure wherein a king pin is employed and an improved king pin locking structure is provided.

Further, it is an object to provide means whereby if the trailer gets out of alignment with the tractor sufficient play is provided to act as a hinge to enable the coupling to adapt itself to irregularities in alignment as well as to take up the shocks of too sudden coupling.

Other objects will in part be obvious and in part be pointed out hereinafter.

To the attainment of the aforesaid objects and ends, the invention still further resides in the novel details of construction, combination and arrangement of parts, all of which will be first fully described in the following detailed description and then be particularly pointed out in the appended claims, reference being had to the accompanying drawing in which:

Figure 1 is a side elevation somewhat diagrammatic showing my invention as applied to the lower fifth wheel of a vehicle coupler.

Figure 2 is a detail side elevation of my invention as applied to the mounting of the bracket commonly used with a conventional type of rocking fifth wheel.

Figure 3 is an elevation of the same looking in the direction right to left in Figure 2.

Figure 4 is a detail longitudinal section on the line 4—4 of Figure 3.

In the drawing, in which like numerals of reference indicate like parts in all of the figures, 1 represents a trailer frame and 2 a truck or tractor frame. These frames are coupled together by means of a fifth wheel type coupler which consists of two units, an upper and a lower unit.

My present invention may readily be applied to the mounting brackets of conventional type rocking fifth wheels. This is illustrated in Figures 2 to 4 inclusive, by reference to which it will be observed that 4 represents the contact plate of the lower fifth wheel which has lugs 21 for the rocker shaft 29 that is mounted in the bearing portions 22 of the rocker shaft brackets. These brackets include the vertical webs 23 and base flanges 24 set in rubber blocks or resilient cushions of incompressible material 26 within the boxes 25.

The boxes 25 have removable cover plates 28 through which the cushions may be inserted and removed at will and the boxes also have flanges 27 by means of which they may be secured to the frame 2 of the truck or tractor.

Spacer washers 30 are used when necessary to compensate for variations in frame widths.

It will be observed that with the construction herein disclosed the resiliency of the rubber blocks or cushions permits the plate of the fifth wheel mounted thereon to tilt at the angle required to lift and engage the pin which is a part of the other fifth wheel member. This tilting effect in fifth wheel structures used prior to my invention is obtained by the conventional and patented types of fifth wheel through cross shafts mounted on brackets to give the plate of the fifth wheel a hinge effect and the rocking or tilting is limited to only one direction, namely forward or backward or up and down longitudinally with the tractor truck. In addition to this movement, the rubber blocks or cushions of my invention provide the necessary horizontal or cross up and down or rocking motion which a coupler or fifth wheel connection is subjected to when one wheel of the truck or trailer drops into a depression or travels over a raised object.

The use of the flexible resiliently mounted fifth wheel member or members assures perfect alignment and a full contact surface between the lower plate 4 of the fifth wheel proper and the upper plate 3 and its pin 6 regardless of the difference in angle of the tractor and trailer at the time of contact or coupling.

The most unfavorable criticism of the conventional type of fifth wheel in use prior to my invention is the impact at the time of engaging. By the use of my rubber blocks or cushions this destructive shock is entirely eliminated because the plate on the lower fifth wheel unit and the truck-tractor frame are completely insulated by these rubber blocks or cushions and at no time do they permit a metal to metal contact between the lower fifth wheel unit and the truck frame. These rubber blocks or cushions are so constructed that the cushioning effect is constant right through to the point of absolute connection, thus the impact is no greater at the time of final connection than at the time of the first slight contact. The construction of these rubber blocks or cushions allows for the displacement of rubber as the pressure of the tractor becomes greater at the time of engaging.

Furthermore, through the resiliency of these rubber blocks or cushions, the plate of the fifth wheel which is carried by the web embedded in the rubber is permitted to partially rotate or twist sufficiently to create a better alignment in the event that at the time of the engaging process the pin of the other fifth wheel member is not directly in line with the guide slot on the resiliently mounted fifth wheel member.

The fifth wheel member which is resiliently mounted resumes its normal position at the slightest forward movement of the tractor. This function is not possible to perform by the types of fifth wheels heretofore known, because the cross shafts are stationary and do not permit a rotating or twisting action. It must therefore bring about such alignment by lifting and sliding the entire trailer load into position and this creates a terrific strain on the coupling pin while traveling on one side or the other of the guiding slot until the pin has entirely engaged with the fifth wheel member with which it cooperates.

Further, after the tractor and trailer have been permanently connected, these rubber blocks or cushions act as a shock absorber while the trailer is in operation, practically eliminating road shocks and vertical and horizontal distortion of both the tractor and trailer chassis. This feature greatly reduces the wear on the tractor and trailer and materially lowers the maintenance costs.

This application is a division of my application filed November 24, 1933, Serial No. 699,611. In the present application I make no generic claim to the common subject matter of my present application and the application Serial No. 699,611 aforesaid, as the broad claims and those specific to the first embodiment of the invention disclosed in the application No. 699,611 constitute the subject matter of said original application.

What I claim is:

1. The combination with a tractor and semi-trailer having cooperating fifth wheel members for establishing an articulated connection, of pivotally mounted supporting devices on a fifth wheel member by which it is supported on one vehicle, and means connecting said vehicle to the pivotally mounted devices including rubber elements for insulating metal to metal contact between said devices and said vehicle and bodily movable with the vehicle.

2. The combination with a tractor and semi-trailer having cooperating fifth wheel members for establishing an articulated connection, pivot means for connecting one fifth wheel member to its respective vehicle, fifth wheel member supporting devices pivoted on said means, bodies of rubber covering portions of said devices and movable therewith, and means on said vehicle for receiving the bodies of rubber in connected relation.

3. The combination with a tractor and semi-trailer having cooperating fifth wheel members for establishing an articulated connection, of pivotally mounted supporting devices on one vehicle for supporting the fifth wheel member on said vehicle, said pivotally mounted supporting devices including stationarily mounted boxes, metallic pivot carrying elements having portions projected into the boxes and rubber fillers for the boxes in which fillers said metallic elements are floatingly embedded.

4. A means for mounting a fifth wheel member to a vehicle, said means comprising relatively stationary boxes located one at each side of the fifth wheel member, pivot bearing members flexibly and resiliently mounted within said boxes, said boxes enclosing incompressible resilient material by which said pivot bearing members are insulated from the boxes against metal to metal contact, other pivot bearing members pivotally cooperating with the first pivot bearing members, said boxes and said other pivot members adapted to constitute the mounting means for the fifth wheel member on the frame of the vehicle by which it is carried.

5. In combination with the frame of a vehicle and a fifth wheel member carried thereby, of means for mounting said fifth wheel member on said frame, said mounting means comprising a pair of pivot members located at each side of the fifth wheel, one of the members of the pair having a projecting web, a box into which said web projects, a rubber filler for said box in which said web member is embedded, the rubber filler serving to insulate the web member from the box against metal to metal contact and floatingly support said web member, said box and the other pivot member of the pair being adapted for mounting between the fifth wheel and the frame of the vehicle whereby the fifth wheel will rock on a transverse axis substantially as shown and described.

6. In a fifth wheel construction, the combination with a chassis element and a fifth wheel element, a pivotally mounted horizontal cross-shaft located between the fifth wheel element and the chassis element, a housing carried by one of said elements, cushioning means disposed within said housing, and a bearing member on said cross-shaft and having a portion thereof disposed within said housing for free floating movement within said housing, said cushioning means serving to hold said portion of said bearing member insulated from the housing against metal to metal contact.

7. In a fifth wheel construction, the combination with parallel chassis elements and a fifth wheel which includes a lower element, a horizontal cross-shaft located between said chassis elements and said fifth wheel element, means for connecting said cross-shaft to the said chassis and fifth wheel elements, said means including a pair of spaced apart bearing members and a pair of spaced apart housings therefor, cushioning means disposed within the respective housings, said bearing members each having a portion thereof disposed within its respective housing for free floating movement, said cushioning means serving to insulate said portions from said housings against metal to metal contact.

8. In vehicle couplings wherein is provided an upper and a lower fifth wheel coupling member adapted for cooperative connection, means to mount one of said fifth wheel members on one vehicle and means to mount the other of said fifth wheel members on another vehicle, at least one of said means including a pair of stationary receptacles, webs of X-shape in horizontal cross section projecting from one of the fifth wheel coupling members into said receptacles, and base webs connected to said X-shaped webs and located within the respective receptacles, an elastic means in each receptacle for floatingly mounting its respective web in the receptacle, thereby elastically connecting the coupling member with the receptacle, said elastic means comprising cushions of rubber in which the portions of said webs are embedded.

9. In fifth wheel structures wherein is provided a lower fifth wheel member and an upper fifth wheel member pivotally connected together; two connected members, means to mount one of said members on the other, said means comprising a horizontal shaft, shaft supports located at each end of said shaft rigidly secured to one of said members, boxes mounted on the other of said members, bearing means in which said shaft is journalled, said bearing means including portions projecting into said boxes, rubber means to space said portions from contact with said boxes and float said portions in the boxes with cushioned movement in any direction.

10. In vehicles, a fifth wheel mounting plate, means including a rocker shaft on which said plate is carried, said means also including spaced bearing brackets for the shaft and incompressible resilient means for supporting said shaft for rocking movement on a horizontal axis and for limited movement in any direction, said last named means including vertical webs of X-shape in cross section and a horizontal base web for each vertical web, resilient incompressible bodies in which said webs are mounted and boxes for containing and restraining the movement of the incompressible resilient bodies.

LUBBERT E. LUBBERS.